April 16, 1963 R. D. DE BAERE 3,085,823
SELF-GRIPPING AND READILY RELEASABLE ROPE TIE
Filed Dec. 13, 1960

INVENTOR:
RICHARD DeBAERE
BY: *Arthur J. Hansmann*
ATTORNEY

United States Patent Office 3,085,823
Patented Apr. 16, 1963

3,085,823
SELF-GRIPPING AND READILY RELEASABLE
ROPE TIE
Richard D. De Baere, 2404 Gillen St., Racine, Wis.
Filed Dec. 13, 1960, Ser. No. 75,629
3 Claims. (Cl. 289—17)

This invention relates to a device for a self-gripping string or rope tie.

Since this particular invention has utility with regard to fish stringers, the description hereof is directed at that particular art. Accordingly, it is an object of this invention to provide an improved fish stringer which is very simple in construction and therefore inexpensive in manufacture, but yet which is superior in its function as a fish stringer where it is desired to remove the fish from the stringer without having to move the fish back over the length of the string or rope along which the fish were originally threaded.

Another object of this invention, and in keeping with the foregoing object, is to provide a fish stringer which can be readily detached or loosened so that the fish will simply fall off the string when it is desired to remove them from the string.

Other objects and advantages will become apparent upon reading the following description in light of the accompanying drawings wherein.

Figure 1:
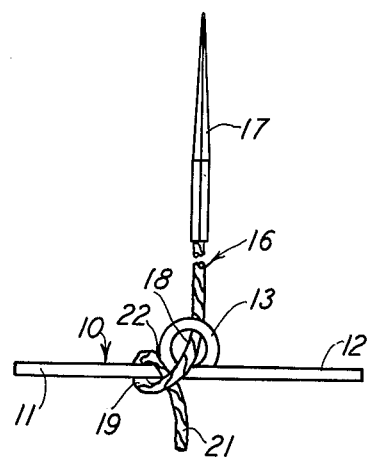
FIG. 1 is a side view of a preferred embodiment of this invention and showing a fragment of the string or rope in the embodiment.
Figure 2:
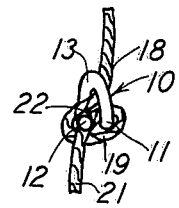
FIG. 2 is an end elevational view of that shown in FIG. 1.

The drawings show a rod or wire generally designated 10 in FIGS. 1 and 2 and the member 10 includes an end 11 and an opposite end 12. Further, the member 10 includes a loop 13 which it will be understood is formed in the member 10 by simply bending the member 10 around into the loop form shown such that in the side view of FIG. 1, the member 10 appears $\Omega$-shaped with this shape being similar to the script writing of a lower case letter "e." Here it will also be noted that the loop 13 is formed so that the ends 11 and 12 are laterally offset as shown in FIG. 2 and thus the portions of the loop 13 adjacent the ends 11 and 12 are spaced apart as shown in FIG. 2.

A rope or string generally designated 16 can be of a conventional type onto which fish are to be strung by passing the needle 17 through the fish's gill and out the fish's mouth and the fish is then permitted to drop down on the rope 16 until it engages the member 10 which then secures the fish as desired.

The rope 16 is shown to be tied to the member 10 by the novel means of having the first portion 18 of the rope 16 extend through the loop 13 from one axial side thereof and around the opposite side of the loop 13. Another or second portion 19 of the rope 16 continues on from the portion 18 and is looped around the end 11 and it is passed between the loop 13 and the rope first portion 18 to extend in a free end 21. At this time it is important to note that the rope portion 19 is securely held in position and resists a pull on the rope portion 18 by being wedged between the portion 18 and the loop 13 with the latter point of wedging or abutment being at the location indicated 22. At this time it will also be understood that since the rope portion 18 extends through the loop 13, the latter guides the portion 18 so that the relative position of the member 10 with respect to the rope 16 is of no concern with regard to retaining the rope 16 secured to the member 10. That is, regardless of the direction of pull on the rope 16, the line of force resulting from the pull must of course be directed through the loop 13 and this force automatically secures the rope portion 19 against the rope portion 18 and the area 22 of the lop 13. Further, when it is desired to remove the member 10 from the rope 16, one need only withdraw the portion 21 from its wedged position and such withdrawal can be readily accomplished by simply loosening the portion 18 on the portion 19, and then the portions 19 and 21 can be readily removed from the member 10 so that the rope 16 can be separated from the member 10.

Figure 3:
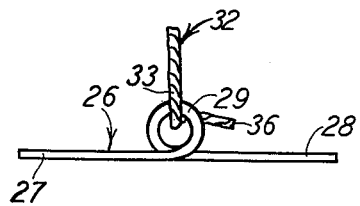
FIG. 3 is a side elevational view of another embodiment of this invention and having again a part of the string or rope removed.
Figure 4:
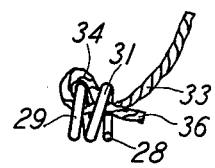
FIG. 4 is an end elevational view of that shown in FIG. 3.

FIGS. 3 and 4 show another embodiment of this invention, and here a member generally designated 26 is shown to have two straight ends 27 and 28 with two loops 29 and 31 formed between the ends and in the member 26. Here, also it will be noted that the loops 29 and 31 are spaced apart and the rope generally designated 32 has a first portion 33 threaded through the loops while a second rope portion 34 extends around one of the loops and it continues back through the loop 31 in an end portion 36. The end portion 36 is therefore disposed between the loop 31 and the rope portion 33 so that a pull on the rope will automatically tighten the rope with the member 26 since the rope portion 36 is being wedged against the interior of the loop 31.

In both of these embodiments it will therefore be noted that a first portion of the rope extends through the loop and a second portion of the rope extends between a loop and a first portion of the rope so that upon pulling the latter, the second portion is automatically wedged between the first portion of the rope and the loop. The embodiments therefore utilize the confining and circular characteristics of the loop in the wire members 10 and 26.

Also, from the foregoing description of the apparatus, it will be readily understood as to what the method of forming the tie will be. It should also be noted that the diameters of the strings or ropes 16 and 32 are approximately the same as the diameters of the rods 10 and 26. Still further, note that the spacing between the loop portions 11 and 13 in FIG. 2 and between the loops 29 and 31 in FIG. 4 are such that the respective ropes do not pass between the loops when the ropes are disposed in the positions shown in the drawings and thus the pull on the ropes causes them to be self-tightening with respect to the rods.

It will also be understood that the members 10 and 26 can be made of a rigid wire material, however, when the loops are disposed therein as shown, the loops will become slightly flexible if a sufficient force is applied on the ropes and it is therefore stated that the loops are resilient by virtue of their coiled or looped disposition, and such resiliency causes the loops to bind upon the rope so that the latter is even gripped by the loops when the rope is pulled. It has been found that a wire with a loop of interial diameter three times the diameter of the wire is satisfactory.

What is claimed is:
1. A readily releasable self-gripping string or rope tie comprising a one-piece wire of a slightly resilient material and including at least one loop disposed therein to render said wire $\Omega$-shaped, and a flexible string extending in one portion through said loop from one axial side thereof and around the other axial side thereof and back toward said one portion, and thence extending, in an another and continuing portion thereof, between a loop of said wire and said one portion for self-tightening of said string on said wire in response to pulling said string and for ready release of said string by removing said another portion from between said loop and said wire.

2. A self-gripping and readily releasable string or rope tie comprising a slightly flexible wire disposed in a looped configuration and including at least one loop therein and with the ends of said wire extending in opposite directions on opposite sides of said loop and contiguously and tangentially therefrom, said wire at said loop forming a space between the portions contiguous with said ends, and a flexible string of a diameter slightly less than said space extending in one portion through said loop from one axial side thereof and around the other axial side thereof and back toward said one portion and thence extending, in an another and continuing portion thereof, into said space and between said loop of said wire and said one portion for self-tightening of said string with said wire in response to pulling said string and for ready release of said string by removing said another portion from between said one portion and said wire.

3. A self-gripping and readily releasable fish stringer comprising a slightly flexible wire including two loops adjacently disposed along the length thereof and having a space therebetween and with the free ends of said wire extending tangentially from said loops in opposite directions, and a fish string of a diameter only slightly less than the dimension of said space and extending through both said loops from one axial side thereof and extending back toward itself and around one of said loops and through said space and through the other of said loops from the other axial side thereof for binding said fish string on said wire in response to a pull on said fish string.

References Cited in the file of this patent

UNITED STATES PATENTS 952,528    Judge ------------------ Mar. 22, 1910

OTHER REFERENCES

Graumont Shensel: Encyclopedia of Knots.